(No Model.)

A. N. WOODARD.
NUT AND BOLT LOCK.

No. 566,050.  Patented Aug. 18, 1896.

Witnesses:
J. T. Coleman
E. A. Finckel

Inventor
Alvin N. Woodard
by W. F. Finckel
Atty.

UNITED STATES PATENT OFFICE.

ALVIN N. WOODARD, OF MANSFIELD, OHIO.

NUT AND BOLT LOCK.

SPECIFICATION forming part of Letters Patent No. 566,050, dated August 18, 1896.

Application filed December 26, 1895. Serial No. 573,277. (No model.)

*To all whom it may concern:*

Be it known that I, ALVIN N. WOODARD, a citizen of the United States, residing at Mansfield, in the county of Richland and State of Ohio, have invented a certain new and useful Improvement in Nut and Bolt Locks, of which the following is a full, clear, and exact description.

It is desirable in all bolt and nut locks to leave the bolt, and especially its thread, and also the nut, intact, and it is also important in many cases that the bolt or nut locking device shall be capable of removal at pleasure, and it is also of importance that such a locking device shall have the capacity of adjustability to compensate for wear.

With these facts in mind my invention consists of an independent threadless sleeve provided with a series of spirally-arranged holes, and adapted to be slipped upon the end of a bolt beyond the nut and be secured to the bolt and against the nut by means of a pin passed transversely through the sleeve and bolt, all as I will proceed now more particularly to set forth and finally claim.

Figure 1:
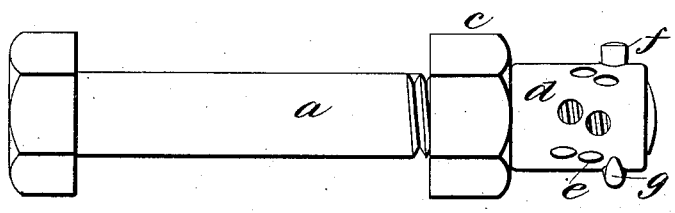
Figure 2:
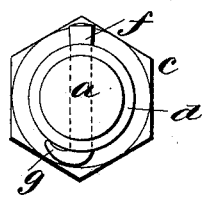
Figure 3:
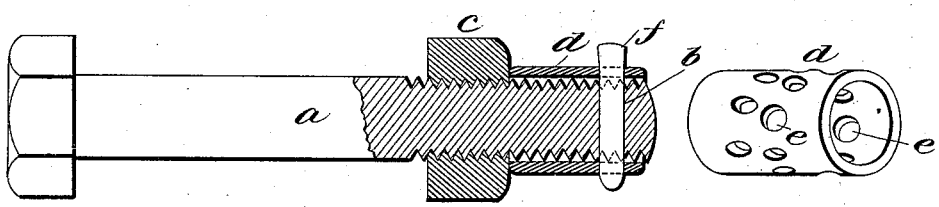
Figure 4:
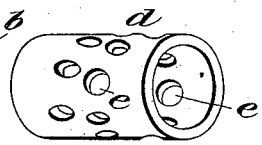
Figure 5:
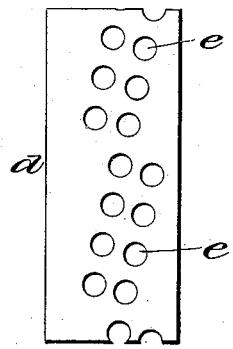

In the accompanying drawings, in the several figures of which like parts are similarly designated, Figure 1 is a side elevation. Fig. 2 is an end elevation. Fig. 3 is an elevation with the threaded end of the bolt and the sleeve in section. Fig. 4 is a perspective view of the sleeve, and Fig. 5 is a developed view of the sleeve.

The bolt $a$ may be of any approved construction, and for the purposes of my invention is provided with a through-hole $b$ in the outer end of its threaded portion.

$c$ is a nut, also of any approved construction. $d$ is a tubular threadless sleeve, of slightly greater bore than the greatest diameter of the bolt, so as to be capable of being slipped over the end of the bolt beyond the nut and to be butted up against the outer face of the nut. As shown more especially in Figs. 1 and 5, this sleeve is provided with one or more series of holes $e$, arranged on a pitch of a very quick screw-thread, and suitably spaced to provide for a very great number of adjustments of the sleeve in order to adapt it to any length of projection of the bolt beyond the nut. In order to lock the sleeve against the nut to hold the nut in place and to prevent the sleeve from turning, the sleeve is turned until two of its opposite holes are in alinement with the hole $b$ in the bolt, and then a pin or key $f$ is driven through the sleeve and bolt, and its lower end $g$ is bent over or turned up against the sleeve in order to retain it in position.

It will be seen that my sleeve may be applied to any kind of nut without requiring any special adaptation of nut for coöperation therewith.

As is obvious, the pin or key $f$ is the medium by which the locking of the device is effected, and hence it follows that if the key be removed a change of adjustment may be effected, and a bolt or nut may be readily removed intact and replaced, a new pin being the only additional expense necessary to this end.

I have shown, and hereinafter particularly claimed, a sleeve having registering-holes on opposite sides; but I wish to be understood as not limiting my invention to that construction, for it is obvious that instead of passing the pin entirely through it may be simply extended into the bolt, and while I do not consider such a construction as desirable as and prefer the construction where the pin passes entirely through, so as to be capable of having its end turned over, upset, clenched, or otherwise treated, so as to fixedly hold the pin in position, still I mean to include both constructions in my claims.

What I claim is—

1. A nut or bolt lock comprising an independent threadless sleeve, made and applied wholly independently of the nut, adapted to encircle a bolt and butt against a nut thereon, and having a series of spirally-arranged holes, and a pin or key adapted to be engaged with one of said holes and a hole in the bolt upon which it is desired to lock the nut, substantially as described.

2. A nut or bolt lock comprising a threadless sleeve made and applied wholly independently of the nut, and having one or more series of oppositely-registering spirally-arranged holes, and a pin or key adapted to be passed through said holes and a hole in the bolt to which it is applied, substantially as and for the purpose described.

In testimony whereof I have hereunto set my hand this 25th day of November, A. D. 1895.

ALVIN N. WOODARD.

Witnesses:
A. J. TWITCHELL,
R. W. HARTMAN.